United States Patent [19]

Hill et al.

[11] 4,131,013

[45] Dec. 26, 1978

[54] IONIC AIR SPEED INDICATOR

[75] Inventors: Maynard L. Hill, Silver Spring; Theodore R. Whyte, Fulton, both of Md.

[73] Assignee: The Johns Hopkins University, Baltimore, Md.

[21] Appl. No.: 818,765

[22] Filed: Jul. 25, 1977

[51] Int. Cl.² ............................................. G01P 5/08
[52] U.S. Cl. ................................... 73/181; 73/194 F
[58] Field of Search ................. 73/181, 194 F, 194 E; 250/356, 384, 389

[56] References Cited

U.S. PATENT DOCUMENTS

| | | | |
|---|---|---|---|
| 2,515,221 | 7/1950 | Henning | 73/194 A X |
| 2,658,724 | 11/1953 | Arps | 73/194 F X |
| 2,933,924 | 4/1960 | Jenks | 73/194 F |
| 3,258,964 | 7/1966 | Zessoules | 73/194 F |
| 3,706,938 | 12/1972 | Petriw | 73/194 F X |
| 3,870,888 | 3/1975 | Lovelock | 250/389 X |

OTHER PUBLICATIONS

Lovelock et al. – "An Ionization Anemometer" – *Journal of Scientific Instruments* – vol. 26, Nov. 1949, p. 367.

*Primary Examiner*—Charles A. Ruehl
*Attorney, Agent, or Firm*—Robert E. Archibald; Marc A. Block

[57] ABSTRACT

The invention relates generally to measuring the air speed of an object moving within the earth's atmosphere. In particular, the invention provides apparatus which comprises means for causing an air flow to enter an electric $\vec{E}$ field chamber, proportional to air speed, a portion of the air in the air flow being ionized prior to entry into the $\vec{E}$ field. Air speed is measured by the current resulting from charge separation in the field.

7 Claims, 2 Drawing Figures

IONIC AIR SPEED INDICATOR

STATEMENT OF GOVERNMENT INTEREST

The invention herein described was made in the course of or under a contract or subcontract thereunder, with the Department of the Navy.

BACKGROUND OF THE INVENTION

Prior motion detection mechanisms used for indicating the speed of airborne objects have typically been costly, complicated, or bulky when effective at all. Many current aeronautical applications, such as missiles, short take-off and landing (STOL) aircraft and remotely piloted vehicles, require sensitive, reliable, and accurate motion detectors of low weight and volume and have thus created needs unsatisfied by prior art devices.

U.S. Pat. No. 3,241,374, for example, which provides for the sensing of heat, or convection, currents in a sensor attached to a moving body in order to determine acceleration of the body, has lacked accuracy and sensitivity where thermal changes and thermistor variations can adversely affect performance. In addition, the size and complexity of the prior art unit has made it impractical for the aforementioned applications.

Other references, such as U.S. Pat. No. 3,106,678, have avoided temperature effects by using various electrical or electronic characteristics in measuring the motion of a body. For example, as in the cited reference, bunches of positive ions are formed at an electrode and are then accelerated electrically through cathodes toward "vanes" which sense the ions as they pass. By comparing and mixing the frequencies of the ion signal as it passes different points along the path of flow of the ions, the acceleration of the body is determined. The positive ion generator used in conjunction with various types of electrodes, converters, and phase comparators, however, has diminished the ruggedness and simplicity of the electronic motion detector. Further, the prior art discloses closed-loop operation and the requirement of propelling the ions electrically even during periods when the body is stationary. Finally, some of the prior art techniques are also complicated by features which require the counting of ions or the mixing of ion signals or the deflection of an ion beam in response to the acceleration of the body. Prior art apparatuses have thus generally required considerable, sensitive, costly circuitry to perform their desired function.

SUMMARY OF THE INVENTION

The present invention, to the contrary, improves the performance of previous pitot-static pressure transducers and achieves simplicity, compactness, accuracy, and economy by means of an open-loop configuration which requires no pump, ion beam accelerator or beam deflector.

Instead, the present invention is provided with a chamber or sleeve containing positive and negative ions. A fluid flow (air, for example) corresponding to the air speed of the body, enters an opening at one end of the chamber or sleeve, mixes with the ions, and exits at an opening at the other end of the chamber or sleeve. The mixed flow then passes between two parallel conducting plates. Each of the plates is charged to a different d.c. level, thereby creating an electric (É) field and a constant voltage between the plates. As the mixed flow passes through the É field, a current resulting from charge separation (that is, the movement of the positive and negative ions toward the corresponding opposite polarity plate) is produced. Assuming a constant source of ions in the chamber or sleeve, the flow of ions into the É field will depend on the fluid flow.

It is well-known that the fluid flow is, ideally, proportional to $v^2$, the square of the air speed. The fluid flow is also nearly proportional to the current caused by the charge separation in the É field. The charge separation in the É field thus creates a measurable current approximately proportional to $v^2$. Effects due to the recombination of ions in the É field vary the proportionality somewhat, but can be compensated for to assure accuracy.

The major elements of the invention are a fluid flow input, a source of ions which can be mixed into the flow, an electric field into which the mixed flow can enter, means for measuring changes in current due to the separation of charge in the É field, and a static pressure output for the flow. Neither ion accelerators nor deflection-producing elements, which limit utility and versatility, are required.

The ram-pressure type of input employed in the invention is particularly significant for a number of reasons. First, as previously mentioned the flow or pressure input is an indicator of air speed; second, it creates an ionic flow without the need for electrodes; and, third, it conveys positive and negative ions equally to recombine in and effect the É field in a measurable way. Finally, the physical relationships between air speed, fluid flow, and current effects render the present invention, as distinguished from other apparatuses, especially useful in measuring speed as opposed to acceleration.

DESCRIPTION OF THE INVENTION

Figure 1:
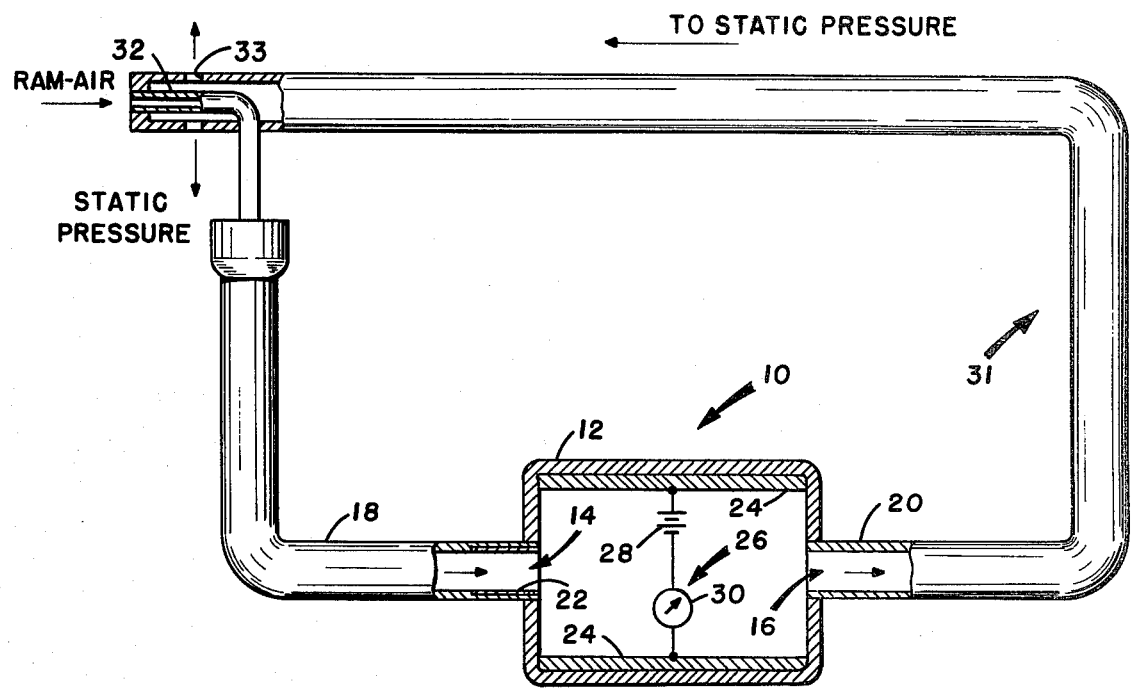
FIG. 1 is a cross-section view of a first embodiment of the invention.

Referring to FIG. 1, one embodiment of the invention 10 is shown in cross-section. A housing 12 is provided which has two openings 14 and 16, which essentially define a flow path through the housing 12. Tubular members 18 and 20 fit into the openings 14 and 16 respectively. The tubular member 18 has a recess collar at its inner end for receiving a cylindrical sleeve 22 flushly therein. The sleeve 22 is comprised of a radioactive substance, such as Polonium or Americium. A fluid (such as air or another gas) passes into tubular member 18 and through sleeve 22 wherein a portion of the gas which is caused to flow through the tubular member 18 and into the interior of the housing 12 is ionized. By making the cylindrical sleeve 22 flush with tubular member 18, the fluid flow remains steady and smooth. Two electrically conductive plates 24 are disposed on opposite interior walls of the housing 12 and are electrically insulated from each other. The plates 24 are joined to a circuit 26 comprised of a battery 28 and a sensitive current meter 30, the battery 28 causing an electric (É) field to exist between the plates 24.

The invention 10 is disposed within a "fluid circuit" 31 comprised of a ram-air pitot probe 32 which communicates with the exterior of the airborne object on which the system is carried. Air delivered to the tube 18 is ionized at least partially by the radioactive substance in the sleeve 22 and then enters the interior of the housing 12. The speed of the airborne object is directly related to the air flow entering the tubular member 18 (flow is proportional to the square of the speed, i.e. $v^2$). Also, the greater the air flow, the greater the ionization of the air passing through the member 18 and into the interior of the housing 12. Thus, the number of ions flowing into the $\vec{E}$ field between the plates 24 is proportional to the air speed of the airborne object. Air speed can thereby be derived from the reading on the current meter 30 as a current resulting from charge separation in the $\vec{E}$ field.

Air exits the housing 12 through the tubular member 20 and is channeled to a "static" pressure through openings 33 of the fluid circuit 31 in a known fashion.

Figure 2:
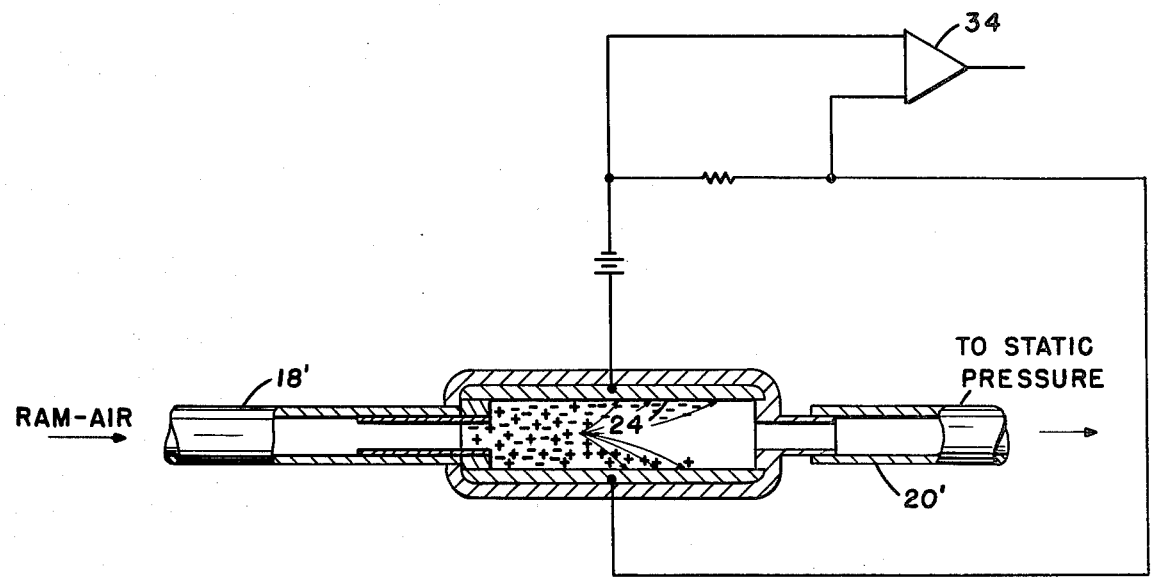
FIG. 2 is a cross-section veiw of a second embodiment of the invention.

To further enhance the sensitivity of the invention, a comparator 34 can be included across the plates 24 as shown in FIG. 2. As the ions separate in the $\vec{E}$ field, the charge on the plates 24 will vary thus altering the inputs to the comparator 34. Significant charge separation in the housing 12 which corresponds to a large ionic fluid flow, will diminish the difference in charge on the plates 24. Likewise the plates 24 will continue to have greatly disparate charges, according to the strength of the imposed $\vec{E}$ field, where there is only minimal charge separation. These differences in charge differentials on the plates 24 are measured by the output of comparator 34.

Other minor modifications are, of course, within the scope of the invention. For example, the sleeve 22 need not be flush with the tubular member 18; also the sleeve 22 and the tubular members 18 and 20 need not be cylindrical. The sleeve 22 can be attached on the inner surface of tubular member 18 and may be tapered. Further, instead of being a sleeve, the source of ions can be a point source (not shown) placed in the center of the tubular member 18 radiating outward toward the inner wall of the tubular member 18. The source may, of course, also be a planar or line source (not shown) running along the axis of the tubular member 18. Still further, any conventional method for measuring current changes, accumulation-of-charge changes, and voltage changes between two conducting plates can be used as an alternative sensor means in accordance with the invention. In addition, as illustrated in FIG. 2, the open-loop configuration of the invention includes a straight-line embodiment wherein the tubular members 18' and 20' are not curved.

It is to be understood that the invention can be practiced other than as described hereinabove, the scope of the invention being limited only by the appended claims.

What is claimed is:

1. An apparatus for measuring the speed of a moving body, comprising:
    a source of positive and negative ions,
    two parallel conducting plates,
    means, connected to the conducting plates, for generating a constant voltage and an electric field between the plates, means, connected to the source, for directing a fluid first into the source to ionize the fluid, and for directing the ionized fluid between the conducting plates, causing charge separation in the field and an attendant electric current between the plates, wherein the fluid directing means comprises:
    a ram-air input, connected outside the moving body, for inletting a flow of air while the body is in motion, and
    first tubular means for connecting the ram-air input and the source of ions, and
    means, connected between the conducting plates, for sensing variations in the electric field between the conducting plates,
    wherein the speed of the moving body is a function of the rate of flow of the fluid and the rate of flow of the fluid is measured by the current between the plates.

2. An apparatus for measuring the speed of a moving body, as in claim 1, wherein the ram-air input is a ram-air pitot probe.

3. An apparatus for measuring the speed of a moving body, as in claim 1, further comprising:
    means, connected to the conducting plates and the source, for housing and insulating from external electrical effects the conducting plates and the source,
    an output element wherein air is maintained at a constant, static pressure, and
    second tubular means, connected between the housing and insulating means and the output element, for transporting the ionized air flowing from the conducting plates into the output element.

4. An apparatus for measuring the speed of a moving body, as in claim 3, wherein the location at which the first tubular means is connected to the housing and insulating means is aligned with the location at which the second tubular member is connected to the housing and insulating means, such that the path between the two locations is transverse to the electric field, and wherein the source of ions is placed within a recess of the first tubular member thereby creating a flush surface with the inner wall of the first tubular member.

5. An apparatus for measuring the speed of a moving body, as in claim 3, wherein the ram-air input, the first tubular means, the source of ions, the housing and insulating means, the second tubular means, and the output element comprise an open-loop, fluid circuit.

6. An apparatus for measuring the speed of a moving body, as in claim 1, wherein the variation sensing means comprises a current variation sensing means.

7. An apparatus for measuring the speed of a moving body, as in claim 1, wherein the variation sensing means comprises a comparator receiving one input from one conducting plate and the other input from the other conducting plate, the output from the comparator reflecting variations in the field between the conducting plates.

* * * * *